April 7, 1936.   C. N. PADEN   2,036,434
APPARATUS FOR CONTROLLING ELECTRICAL DEMAND
Filed March 20, 1933
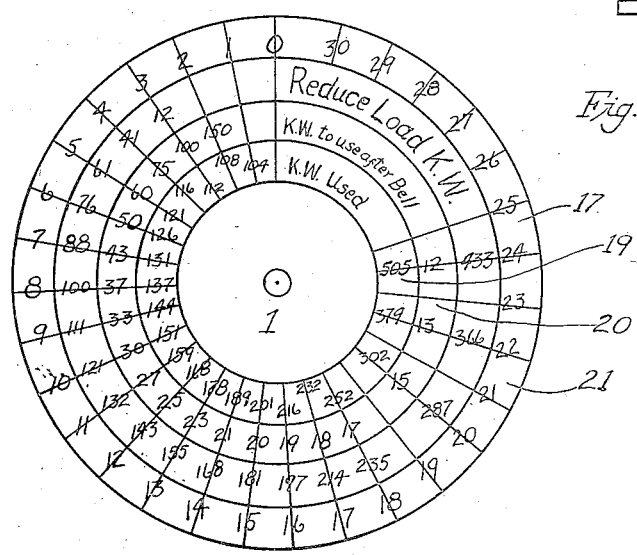
Carter N. Paden
Inventor.

Patented Apr. 7, 1936

2,036,434

UNITED STATES PATENT OFFICE 2,036,434

APPARATUS FOR CONTROLLING ELECTRICAL DEMAND

Carter N. Paden, Atlanta, Ga.

Application March 20, 1933, Serial No. 661,688

10 Claims. (Cl. 171—34)

This invention relates to an improved method for measuring and indicating the consumption of electrical energy, and to apparatus suitable therefor. This invention relates more particularly to an improved type of demand meter which enables a consumer of electricity to hold his demand rate below any predetermined maximum considered sufficient for the operation of his equipment.

The charges to the consumer of electricity are based on both his actual power consumption, as indicated by a watt-hour meter, and his maximum rate of power consumption, or "demand", as indicated by a demand meter. It is accordingly to the consumer's interest to maintain a low demand.

A demand meter indicates the maximum power consumption during any one of a series of consecutive periods of time. It is ordinarily used in connection with a watt-hour meter to indicate the integration of the watt-hour meter during each interval of time, which may be 15 or 30 minutes or other period of predetermined length. The demand meter may also have a self-contained integration unit. Such meters may be provided with an alarm bell or other suitable means for indicating when a predetermined consumption of power occurs within the time cycle of the demand meter. When the bell rings the consumer is notified only that he has used this predetermined amount of energy during the then running time cycle of the demand meter. An object of the present invention is to indicate to the consumer how much of this time cycle has expired at the sounding of such alarm, in order that he may determine how great a reduction in his rate of power consumption is necessary in order to keep has demand charge below any desired maximum. Modifications of this invention inform the consumer how much time remains in the time cycle of the demand meter, what reduction in power consumption is necessary, for a given installation, to avoid exceeding the maximum demand charge, and what the demand for that period will be if the rate of power consumption is not decreased.

The drawing illustrates one type of apparatus for carrying out this invention.

Figure 1 is an elevation, partly in section, of one modification of the device, and shows electrical synchronism between a timing device and a demand meter. Figures 2 and 3 are elevations of suitable faces of the timing device. Figure 4 is an elevation, partly in section, of a second modification of the device, and shows mechanical synchronism between a timing device and a demand meter.

Figure 1 shows an elevation, partly in section, of a timing device A and a diagrammatic sketch B of the connection of this device with a demand meter provided with an alarm system. The timing device A contains a dial face 1 supported by a suitable housing 2. A shaft 3 is perpendicular to the plane of face 1, is supported by journal 4 which is fixed in position by suitable connections to the housing, and extends through a hole 5 in face 1. A pointer 6 is connected to the outer end of this shaft. This shaft is rotated by a synchronous motor 7 through suitable gears 8, 9, 10 and 11 so that it makes a complete revolution in the time required for the demand meter 12 to complete one cycle of integration and resetting.

The demand meter 12 may be of any suitable type which integrates an electrical load over separate periods of time. For example, the G. E. demand meter style 39 x 99, type M–16–A may be used. This meter integrates the kilowatt load over a 30 minute period and requires 1¼ minutes to reset for a new integration period. It is connected electrically with a kilowatt hour meter. The demand meter may also be of the type described in U. S. Patent 1,863,414, patented June 14, 1932 by William H. Pratt. This demand meter contains a time controlled resetting mechanism driven by a synchronous motor. The integrating unit is driven through a system of gears from a watt-hour meter register drive shaft of a watt-hour meter adapted to be used therewith. This demand meter is indicated diagrammatically at 12. The shaft 13 rotates through an arc proportional to the quantity of electricity measured by a watt-hour meter. The synchronous motor of the resetting mechanism and that of the device A are driven from the same source of alternating current, and are accordingly synchronized. The arc of rotation of the pointer 6 is proportional to the time of integration and resetting of the demand meter. This relation may be any desired ratio, but it is preferred to use a suitable motor and gear train so that the pointer 6 makes one complete revolution in the total time required for the integration of the demand meter and for the period of its resetting (if any) before the start of the next integration period. For example, as with the G. E. demand meter described above, the pointer of device A may make one complete revolution in 31¼ minutes. The demand meter may indicate continuously its integrated reading, or it may indicate only the maximum or peak load during a series of operating cycles. It is desirable, especially in the latter case, to have a means connected with the demand meter for indicating when (and if) a definite demand occurs within an integration period. The integrating mechanism may be adapted to force down a member 12a at any predetermined demand, thereby closing switch 14 in an alarm circuit. Such alarm circuit may contain a relay 15 and a bell 16 and be so constructed that the bell rings from the time of the occurrence of the predetermined demand until the end of that period of integration of the demand meter. On the lifting of the member 12a, which occurs preferably during the resetting of the demand meter at the end of its integration period, the switch 14 is opened by the spring 14a.

The face of the device A may carry a scale divided into any suitable subdivisions. The scale may be suitably divided to indicate the minutes of the integration period of the demand meter and the time required for its resetting before the start of the next integration period.

Figure 2 indicates a face to be used with the G. E. demand meter described above. This face contains a scale 17 divided into 31 parts, designed for use with the pointer 6 making one revolution in 31¼ minutes. The first part 18 represents 1¼ minutes, or 14.4° of the scale. The remainder of the scale is divided into 30 equal parts representing one minute each. The divisions are numbered in numerical order in a counter-clockwise direction. With the pointer rotating clockwise, the scale indicates for any position of the pointer the number of minutes remaining before the demand meter completes the present integration period.

As an example of the operation of this invention, a consumer of electricity desires to keep his demand charge below 110 k. w. The alarm of the demand meter is set to indicate when a 100 k. w. demand is reached, allowing a margin of 10. If the alarm then sounds when the pointer 6 is at the number 5 on the scale 17, it indicates a rate of 100 k. w. in the first 25 minutes of the present integration period, and that not more than 10 k. w. demand must be used in the remaining 5 minutes in order to prevent the reading of the demand meter increasing above 110.

The rate of power consumption at the sound of the alarm is:

$$100 \text{ k. w.} \times \left(\frac{30}{30-5}\right) = 120 \text{ k. w.}$$

If the rate of consumption has been uniform for the integration period, and is not changed, the demand meter will indicate 120 k. w. at the end of the period.

The rate of power consumption allowable for the remainder of the period, to keep the demand rate at 110 k. w. is:

$$\frac{(100 \text{ k. w.} \times 30 \text{ mins.}) - (120 \times 25)}{5} = 60 \text{ k. w.}$$

The amount of load to take off the line is then:

$$120 - 60 = 60 \text{ k. w.}$$

Accordingly, if the consumer stops the operation of electrical equipment using 60 k. w. when the alarm sounds, his demand rate will be 110 for that period.

Similar calculations may readily be made for any other position of the pointer. The results may be tabulated for convenient use in connection with the time indicating device. For a permanent installation, and for quick reference, it may be desirable to add one or more scales to the time scale of the timing device to indicate any one or more of the following:

A. Rate of power consumption during period of integration of demand meter to time of alarm.

B. Rate of power consumption allowable for remainder of integration period to keep below the predetermined demand.

C. Amount of load to take off line at alarm signal.

Figure 3 indicates a face for the timing device A with one combination of the above scales. The scales are for an installation where a demand of 110.8 k. w. is desired, and where a 10 k. w. margin is considered sufficient. Scale A is 19, B is 20, and C is 21.

Similar scales or tabulations to the above may be made for any other electrical installation, depending upon the length of time for the integration of the demand meter, the demand rate desired, and the margin of alarm. The margin of alarm, 10 k. w. in the above example, will depend upon the flexibility of the installation, the ease with which electrical equipment may be started and shut down and the relative number and size of the various motors, heaters, or other pieces of electrical equipment. In some installations it may be desirable for the margin of alarm to be 25 or even 50% of the predetermined demand rate.

While my invention has been described in connection with particular illustrations and examples thereof, it is obvious that various alterations and modifications may be made therein without departing from the spirit of the invention. For example, the timing device and the time controlled means of the demand meter may be synchronized by mechanical as well as electrical means. Both may be driven by the same motor. Both may be constructed and housed as one instrument.

Figure 4 is an elevation partly in section and indicates such a modification in which a single motor 7 is used to drive both the timing device A and the time controlled means of the demand meter B by means of the shaft 3.

This invention is not to be limited by any specific examples or illustrations presented herein, but only by the scope of the claims in which I desire to claim all novelty insofar as the prior art permits.

I claim:

1. A device of the class described comprising a demand meter having a continuously time controlled means and adapted to indicate the maximum demand over a series of consecutive periods of time, means coacting with said demand meter to indicate the occurrence of a predetermined demand and a time indicating means continuously synchronized with said time controlled means to indicate continuously both the passage of said period of time and any exact point in time at which said predetermined demand occurs.

2. A device of the class described comprising a demand meter having an integrating mechanism and a time controlled means comprising a synchronous motor and adapted to indicate the maximum demand over a series of consecutive periods of time, alarm means coacting with said demand meter comprising a bell in an electrical circuit closed by said integrating mechanism on the occurrence of a predetermined demand, and a time indicating means comprising a motor synchronized with said synchronous motor to indicate continuously both the passage of said period of time and any exact point in time at which said predetermined demand occurs.

3. A device of the class described comprising a demand meter having a time controlled means and adapted to indicate the maximum demand over a period of time, alarm means coacting with said demand meter to indicate the occurrence of a predetermined demand, a time indicating means to indicate continuously the passage of said period of time comprising a continuous driving mechanism synchronized with said time controlled means, a pointer driven by said mechanism, and a scale cooperating with said pointer, said scale being divided into segments to indicate fractions of said interval of time.

4. A device of the class described comprising a demand meter having an integrating mechanism and a time controlled means comprising a synchronous motor and adapted to indicate the maximum demand over a series of consecutive periods of time, alarm means coacting with said demand meter comprising a bell in an electrical circuit closed by said integrating mechanism on the occurrence of a predetermined demand, and a time indicating means comprising a motor synchronized with said synchronous motor, a pointer driven by said synchronized motor, a scale cooperating with said pointer, said scale comprising a time scale divided into segments to indicate fractions of said period of time and a numerical scale at divisions thereof indicating the necessary reduction in power consumption required at the sounding of said bell in order to hold the reading of the demand meter below a predetermined maximum for said interval of time.

5. A device according to claim 1, comprising in addition in cooperation with said time indicating means a calculation saving means to indicate the excess of the rate of power consumption at the time of occurrence of said predetermined demand over a predetermined maximum average rate for said period of time.

6. A device of the class described comprising a demand meter having a time controlled means and adapted to indicate the maximum demand over a series of consecutive periods of time, alarm means coacting with said demand meter to indicate the occurrence of a predetermined demand, a time indicating means to indicate the passage of said period of time comprising a driving mechanism synchronized with said time controlled means, a pointer rotated by said mechanism so as to make one complete revolution in said period of time and a scale cooperating with said pointer, said scale comprising a calculation saving means to indicate the excess of the rate of power consumption at the time of indication of said alarm over a predetermined maximum average rate for said period of time.

7. A device of the class described comprising a demand meter having a time controlled means and adapted to indicate the maximum demand over a series of consecutive periods of time, means coacting with said demand meter to indicate the occurrence of a predetermined demand a time indicating means continuously synchronized with said time controlled means to indicate continuously both the passage of said period of time and any exact point in time at which said predetermined demand occurs, and a time controlled driving means to drive and to synchronize both said time controlled means and said time indicating means.

8. A device according to claim 7 in which said time controlled driving means is a synchronous motor.

9. A device according to claim 3 in which said time controlled means and said driving mechanism are both driven by a synchronous motor.

10. A device according to claim 1 in which said time controlled means and said time indicating means are driven and synchronized by a single driving means and comprising in addition in cooperation with said indicating means a calculation saving means to indicate the excess of the rate of power consumption at the time of occurrence of said predetermined demand over a predetermined maximum average rate for said period of time.

CARTER N. PADEN.